United States Patent
Throngnumchai

(10) Patent No.: US 6,449,014 B1
(45) Date of Patent: Sep. 10, 2002

(54) IMAGE SENSOR HAVING A LOW IMPEDANCE READING BLOCK BETWEEN PIXEL DATA LINES AND OUTPUT LINE

(75) Inventor: Kraisorn Throngnumchai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/033,915

(22) Filed: Mar. 3, 1998

(30) Foreign Application Priority Data

Mar. 3, 1997 (JP) .............................. 9-063770

(51) Int. Cl.[7] .............................................. H04N 5/335
(52) U.S. Cl. ....................................... 348/308; 348/304
(58) Field of Search ................................. 348/302, 304, 348/308, 300, 301, 310; 378/98.8; 250/208.1

(56) References Cited

U.S. PATENT DOCUMENTS

| 4,067,046 A | * | 1/1978 | Nakatani et al. ............. 348/308 |
| 5,336,879 A | * | 8/1994 | Sauer ...................... 250/208.1 |
| 5,548,413 A | | 8/1996 | Watanabe |
| 5,600,127 A | | 2/1997 | Kimata |
| 5,640,206 A | | 6/1997 | Kinoshita et al. |
| 5,672,902 A | | 9/1997 | Hatanaka et al. |
| 5,693,932 A | * | 12/1997 | Ueno et al. .................. 348/308 |
| 6,067,113 A | * | 5/2000 | Hurwitz et al. ............. 348/301 |

FOREIGN PATENT DOCUMENTS

JP 10233965 A * 2/1998

OTHER PUBLICATIONS

P. 108 of a Japanese Book titled "Image Input Technical Handbook" published on Mar. 31, 1992.
P. 333 through 353 of a book titled "VLSI Design Techniques for Analog and Digital Circuits".

* cited by examiner

Primary Examiner—Wendy R. Garber
Assistant Examiner—Jason Whipkey
(74) Attorney, Agent, or Firm—Foley & Lardner

(57) ABSTRACT

An image sensor including a plurality of data lines and a plurality of pixels arranged in a two-dimensional form, each pixel having both a horizontal address and a vertical address allocated and including a light receiving element and a switching element for drivingly connecting the light receiving element to one of the data lines which is connected to the same pixel. A reading block is interposed between each of the data lines and an output line and has a predetermined low input impedance with respect to a connection of an input end thereof to each of the data lines.

19 Claims, 12 Drawing Sheets

IMAGE SENSOR HAVING A LOW IMPEDANCE READING BLOCK BETWEEN PIXEL DATA LINES AND OUTPUT LINE

The contents of Application No. Heisei 9-63770, with a filing date of Mar. 3, 1997 in Japan, are herein incorporated by reference.

BACKGROUND OF THE INVENTION a) Field of the Invention

The present invention relates to a solid state image sensor using a plurality of light receiving elements such as photodiodes.

b) Description of the Related Art

A previously proposed image sensor will be described below.

The previously proposed image sensor includes: a horizontal address scanning circuit; a vertical address scanning circuit; and a plurality of pixels (picture elements) each having a photodiode and a switching element such as a first MOS (Metal Oxide Semiconductor) transistor, these pixels being arranged in a two-dimensional form.

A structure of a representative one of the pixels will be described below.

The photodiode has a cathode connected to a fixed potential line such as a plus bias voltage line and has an anode connected to a first electrode such as a drain of the first MOS transistor. A drive electrode such as gate of the first MOS transistor is connected to a corresponding one of the vertical address lines extended from the vertical address scanning circuit. A second electrode such as a source of the first MOS transistor is connected to a corresponding one of data lines. Each of the data lines is connected to an output line via another switching element of a second MOS transistor. The output line is connected to an output buffer. An output end of the buffer is connected to an output terminal of the image sensor.

A gate of the first MOS transistor connected to the data line is connected to the corresponding one of the horizontal address lines. The vertical address scanning circuit and the horizontal address scanning circuit are constituted by shift registers, respectively.

In the previously proposed image sensor, an optical-to-electric converted charge developed according to an incident light quantity on each of the photodiodes is stored in each corresponding one of the photodiodes during a turn-off state of the corresponding first MOS transistor in each corresponding one of the pixels.

In this state, at first, when the corresponding vertical address line is selected (becomes active), the first MOS transistor in each corresponding one of the pixels is, in turn, turned on so that the charge stored in the photodiode of the corresponding one of the pixels is distributed into the corresponding one of the data lines. Next, when the horizontal address line connected to the corresponding data line is selected, the MOS transistor is turned on so that the data line is connected to the output line and the charge in the same data line is supplied to the output buffer via the output line. Consequently, the charge stored in the photodiode can be read.

Such a previously proposed image sensor as described above is exemplified in FIG. 5.34 in page 108 of a Japanese Technical Book titled "Image Input Technical Handbook" authored by Yuji Kiuchi and published on Mar. 31, 1992.

SUMMARY OF THE INVENTION

However, false signals such as a smear and a shading are developed in the previously proposed image sensor.

It is noted that the subsequent explanation on the previously proposed image sensor will be advanced with the pixels of the image sensor constituted by four of a first pixel, a second pixel connected to the same data line as the first pixel, a third pixel connected to the same vertical address line as the first pixel, and a fourth pixel connected to the same data line as the third pixel, the data lines constituted by first and second data lines, and the first data line being common to the first and second pixels and the second data line being common to the third and fourth pixels.

First, a problem of the smear will be described.

While any one of the vertical address lines is selected, all photodiodes in a common row of the pixels connected to the corresponding one of the vertical address lines, e.g., the first and third pixels or the second and fourth pixels, connected to the selected vertical address line via the gates of the first MOS transistors in the common row of the pixels are connected to the respectively corresponding data lines, e.g., the first and second data lines.

For example, suppose that, in order to read the charge in the photodiode of the first pixel, the first vertical address line is selected. At this time, at the same time when the charge stored in the photodiode of the first pixel is distributed into the first data line, the charge stored in the photodiode of the horizontally adjacent third pixel is also distributed into the second data line. On the other hand, since, at this time, the second MOS transistor connected to the second data line is in the turned off state, the second data line indicates a high impedance state.

Hence, the distributed charge from the third pixel is stored in the second data line so that a potential of the second data line is raised.

If the incident light quantity in the photodiode of the third pixel horizontally adjacent to the first pixel is increased, the charge quantity therein is accordingly increased so that the potential of the second data line becomes high. Consequently, the increased potential of the second data line exceeds a threshold value of the first MOS transistor of the fourth pixel which is connected to the same second data line.

Hence, since the first MOS transistor of the fourth pixel horizontally adjacent to the second pixel and vertically adjacent to the third pixel cannot be maintained at its turn-off (unconducted) state any more, the charge in the second data line leaks into the photodiode of the fourth pixel and is stored in the corresponding photodiode of the fourth pixel.

The above-described phenomenon is called a data line saturation and provides a cause of the smear.

Unless the data line saturation occurs, a clear image can be obtained. If certain data lines of any of the rows of the pixels concerned with a light source is saturated, such a smear as if an intense light were radiated into the pixels in the corresponding rows appears on the image.

The smear can occur regardless of whether each of the first and second MOS transistors is a p-type or n-type. In addition, the smear occurs even when the photodiodes are used and operated in a solar battery mode.

In order to prevent the smear from being developed in the image sensor, such a measure as a lowering of a dynamic range of each MOS transistor and/or the buffer would be considered. However, when a field photographing or a night photographing is carried out, a sufficiently clear image cannot be obtained due to its narrowed dynamic range.

Next, the problem of the shading developed in the previously proposed image sensor will be described.

Suppose a situation such that when the image sensor is used and operated under a black darkness condition, i.e., when no incident light is present for all photodiodes, the reading operation is carried out. At this time, the shading phenomenon often occurs. In the reading operation, the first vertical address line is, at first, selected. Then, the first horizontal address line, the second horizontal address line, and so forth are sequentially selected.

When the first MOS transistor, e.g., in the first pixel or the second MOS transistor, e.g., connected to the first data line is turned on, an external charge is supplied to the corresponding MOS transistor and part of the external supplied charge leaks onto a semiconductor substrate via a parasitic capacitance formed between its gate and the substrate. The leaked charge onto the substrate is injected due to a capacitance coupling and diffusion into the source and drain of the MOS transistors of the third and fourth pixels.

At this time, since the second MOS transistor intervened in the second data line is in the turn-off state, the second data line indicates the high impedance state and the leaked charge is stored on the second data line connected to the source of the first MOS transistor of the fourth pixel.

Next, when the second horizontal address line is selected, the second MOS transistor connected to the second data line is turned on so that the stored and leaked charge is read as the false signal. As the scanning of the address lines is advanced, the leaked charges are accumulated. Consequently, the image such that a brightness is increased in the direction toward which the scanning is advanced appears.

Furthermore, the previously proposed image sensor cannot undergo a random access when the image sensor output signal is used for an image processing purpose.

That is to say, when the image processing is carried out, it is necessary to have a random access function such that an arbitrary pixel is read in an arbitrary sequence.

However, in the previously proposed image sensor, the reading operation is divided into two steps. First, one of the vertical address lines is selected so that the charges stored in the photodiodes of the corresponding pixels in the corresponding column are distributed into the correspondingly connected data lines. Next, one of the horizontal address lines is selected. Then, the charges in the respectively corresponding data lines are read from the output line.

For example, when the charge in the photodiode of the first pixel is read, the charge in the photodiode of the third pixel is also distributed into the second date line.

Next, when the charge in the photodiode of the fourth pixel is tried to be read, a dummy read is needed to be carried out to discard the charge in the second data line and to reset the second data line. When the charge in the photodiode of the fourth pixel is read, the charge in the photodiode of the third pixel is discarded. Consequently, at the subsequent stage, the charge in the photodiode of the third pixel cannot be read.

It is, therefore, an object of the present invention to provide an image sensor which can prevent. the false signals such as resulting in the smear and shading from being developed and whose optically-to-electrically converted charge in each pixel can be read in a random access manner.

The above-described object can be achieved by providing an image sensor comprising: a plurality of data lines; a plurality of pixels arranged in a two-dimensional form, each pixel to which both a horizontal address and a vertical address are allocated and including a light receiving element and a switching element for drivingly connecting the light receiving element to one of the data lines which is connected to the same pixel; a plurality of horizontal address lines, each horizontal address line being connected to the pixels to which the same horizontal address is allocated; a plurality of vertical address lines, each vertical address line being connected to the pixels to which the same vertical address is allocated, the switching element connecting the light receiving element in the same pixel to the one of the data lines which is connected to the same pixel when both of the horizontal address and the vertical address allocated to the same pixel are assigned through one of the horizontal address lines which is connected to the same pixel and one of the vertical address lines which is connected to the same pixel; an output line connected to the data lines and having one end serving as an output terminal; and a reading block interposed between each of the data lines and the output line and having a predetermined low input impedance with respect to a connection of an input end thereof to each of the data lines.

The above-described object can also be achieved by providing an image sensor comprising: a plurality of data lines; a plurality of pixels arranged in a two-dimensional form, each pixel to which both of a horizontal address and a vertical address are allocated and including optical-and-electrical converting means for converting an incident light quantity into a corresponding electrical charge and switching means for drivingly connecting the optical-to-electrical converting means to one of the data lines which is connected to the same pixel; a plurality of horizontal address lines, each horizontal address line being connected to the pixels to which the same horizontal address is allocated; a plurality of vertical address lines, each vertical address line being connected to the pixels to which the same vertical address is allocated, the switching means connecting the optical-to-electrical converting means in the same pixel to the one of the data lines which is connected to the same pixel when both of the horizontal address and the vertical address allocated to the same pixel are assigned through one of the horizontal address lines which is connected to the same pixel and one of the vertical address lines which is connected to the same pixel; an output line connected to the data lines and having one end serving as an output terminal; and reading means interposed between each of the data lines and the output line and having a predetermined low input impedance with respect to a connection of an input end thereof to each of the data lines.

BEST MODE FOR CARRYING OUT THE INVENTION

Reference will hereinafter be made to the drawings in order to facilitate a better understanding of the present invention.

First Embodiment

Figure 1:
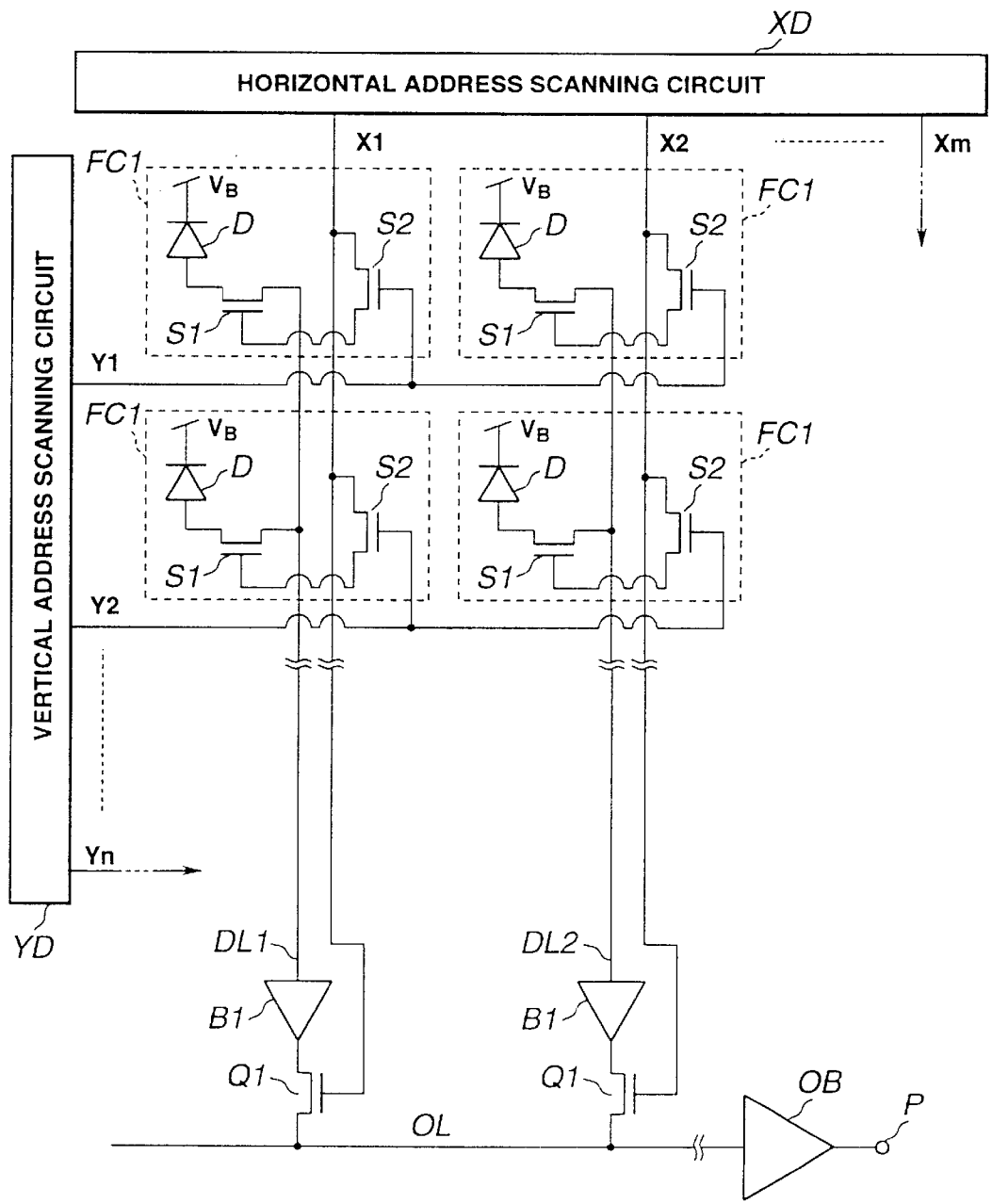
FIG. 1 is a circuit block diagram of an image sensor in a first preferred embodiment according to the present invention.

FIG. 1 shows a first preferred embodiment of an image sensor according to the present invention.

In the image sensor of the first embodiment shown in FIG. 1, an n number of vertical address lines Y1, Y2, - - -, Yn connected to a vertical scanning circuit YD and an m number of horizontal address lines X1, X2, - - -, Xm connected to a horizontal address scanning circuit XD are arranged in a grid form.

The m number of data lines DL1, DL2, - - - DLm are juxtaposed to the m number of the horizontal address lines X1, X2, - - - Xm.

Furthermore, m×n number of pixels FC1 are arranged in a two-dimensional form.

Each pixel FC1 includes: a light receiving element such as a photodiode D; a switching element such as a first MOS (Metal Oxide Semiconductor) transistor S1 for selectively connecting the photodiode D to the corresponding one of the data lines DL1, DL2, - - - -, DLm; and a second MOS transistor S2 whose first electrode such as a drain is connected to the corresponding one of the horizontal address lines X1, X2, - - -, Xm, whose second electrode such as a source is connected to a gate of the first MOS transistor, and whose gate is connected to the corresponding one of the vertical address lines Y1, Y2, - - -, Yn.

The vertical scanning circuit YD and horizontal scanning circuit XD are constituted by shift registers.

Each pixel FC1 is designated by means of a vertical address y on the corresponding one of vertical address lines Y1, Y2, - - -, Yn and by means of a horizontal address x on the corresponding one of horizontal address lines X1, X2, - - -, Xm.

It is noted that $V_B$ in FIG. 1 denotes a positive DC power supply. The number of vertical address lines (Xm) (m=1, 2, . . . , m) may or may not be equal to the number of horizontal address lines (Yn) (n=1, 2, . . . , n).

For example, the source of the first MOS transistor SI of a first pixel FC1 connected to a first one Y1 of the vertical address lines and to a first one X1 of the horizontal address lines is connected to a first one DL1 of the data lines DL1, DL2, - - -, DLm. The first data line DL1 is connected to an input end of a first buffer B1 having a relatively low input impedance lower than several hundreds of KΩ. An output end of the first buffer B1 is connected to an output line OL via an output selecting third transistor Q1. A drive electrode such as a gate of the third transistor Q1 is connected to the first. one X1 of the horizontal address lines. The output line OL is connected to an output terminal P via an output buffer OB.

Similarly, the second data line DL2 is connected to the output line OL via the buffer B1 and via the third MOS transistor Q1.

Next, an operation of the image sensor in the first embodiment will be described below.

An electric charge optically-to-electrically converted by the photodiode D according to a light quantity incident on the photodiode D, e.g., in the first pixel FC1 is stored in the photodiode therein.

When the first vertical address line Y1 and the horizontal address line X1 are selected (this means that the first vertical address line Y1 and the first horizontal line X1 become active and that the first horizontal address and the first vertical address allocated to the first pixel FC1 are designated), the gate of the second MOS transistor S2 is raised to a high level state and the drain thereof is raised to the high level state. At this time, the second MOS transistor S2 is turned on. Since the source of the second MOS transistor S2 in the same pixel FC1 is at the high level state, the gate of the first MOS transistor S1 is turned on. The charge stored in the photodiode D is distributed to the first data line DL1 via the first MOS transistor S1. Since the third MOS transistor Q1 whose gate is connected to the first vertical address line X1 is in the turn-on state, the charge in the first data line DL1 is read into the output line OL passing through the first buffer B1 and the third transistor Q1.

Unless either one of the first vertical address line Y1 or the first horizontal address line X1 is selected, the gate of the first MOS transistor S1 is not in the high level state. In other words, the first MOS transistor S1 in the first pixel FC1 is in the turn-on state only when both of the first vertical address line Y1 and the first horizontal address X1 become active. That is to say, the first MOS transistor S1 is controlled by means of a composite address (x1, y1) constituted by the corresponding horizontal address x1 and the vertical address y1.

In addition, since the second data line DL2 is connected to the first buffer B1 having the low input impedance, a noise charge is not stored in the second data line DL2 but is immediately caused to flow into the first buffer B1 on the second data line DL2 even if the noise charge is picked up in the second data line DL2.

Furthermore, since the second data line DL2 is electrically separated from the output line OL by means of the corresponding third MOS transistor Q1, a parasitic capacitance of the second data line DL2 connected to the output line OL becomes small with the parasitic capacitance only constituted by the third MOS transistor Q1.

In addition, since an output impedance of the first buffer B1 is lowered and the third MOS transistor Q1 is adjoined to the first buffer B1, a low impedance between the first buffer B1 and the third transistor Q1 can be maintained and the pick up of the noise charge can be prevented. In the first embodiment, since each first MOS transistor S1 in each pixel FC1 connected to the corresponding one of the data lines DL1, DL2, - - -, DLm is controlled by means of the composite addresses (x1, y1), (x2, y2), - - - (xm, yn) of the horizontal addresses x1, x2, - - - , xm and the vertical addresses y1, y2, - - - , yn, a random addressing becomes possible.

In addition, since the data lines are connected to the first buffers B1 having the relatively low impedances, the data lines in the non-accessed rows of the pixels FC1 are maintained at low impedances and a resultant development of the false signals such as the smear and the shading from the image sensor can be prevented.

Furthermore, since the third MOS transistor Q1 is connected between the first buffer B1 and the output line OL, the parasitic capacitance in the output line OL is small and a response speed becomes fast.

The accessing to the respective pixels FC1 randomly is possible, the development of the false signals can be prevented, and the response speed can be increased.

In the first embodiment, each data line DL1, DL2, - - - , DLm is arranged in parallel to the horizontal address lines X1, X2, - - - , Xm.

Figure 2:
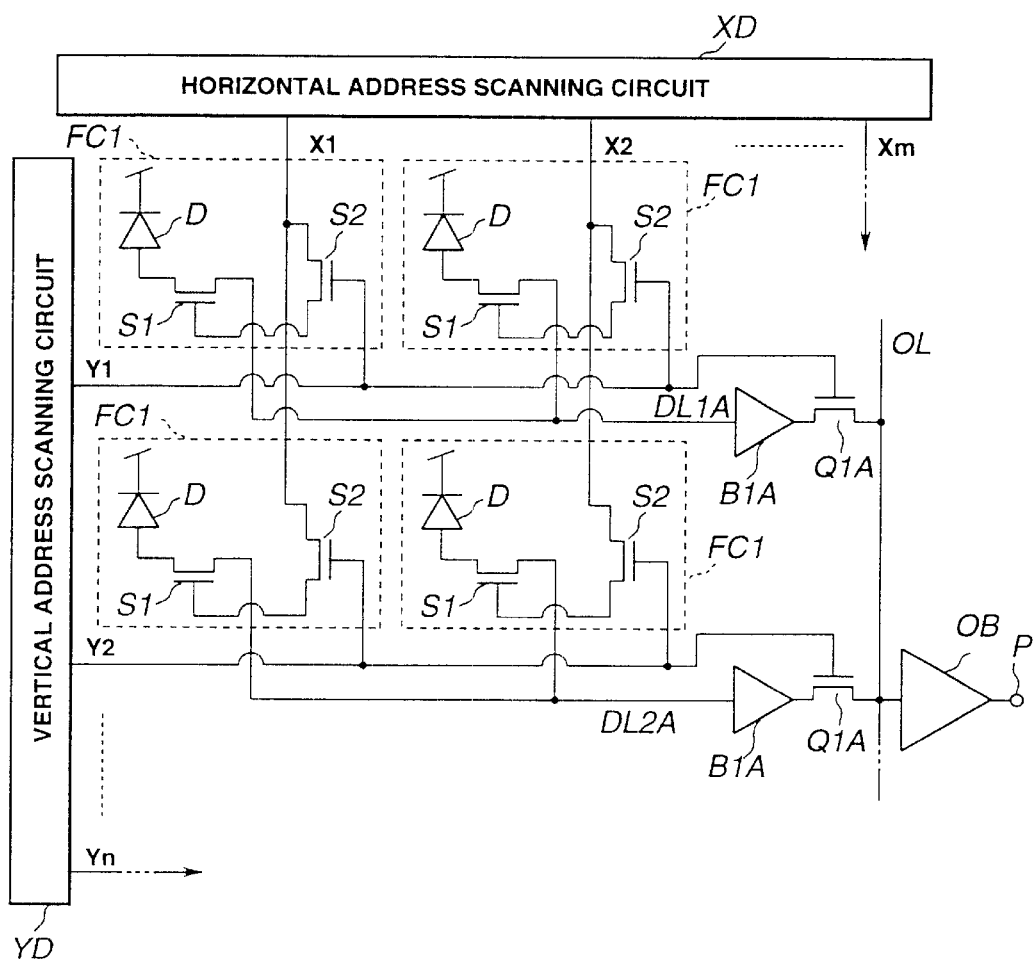
FIG. 2 is a circuit block diagram of the image sensor in an alternative of the first preferred embodiment.

FIG. 2 shows an alternative to the first embodiment.

As shown in FIG. 2, the data lines DL1A, DL2A, - - - may be arranged in parallel to the vertical address lines Y1, Y2, - - - , Yn and connected to the first buffers B1A, respectively. Then, the third MOS transistors Q1A may be controlled by means of the vertical address lines Y1, Y2, - - - , Yn.

Furthermore, alternatively, the data lines may be arranged obliquely or in a corrugated form. Consequently, a degree of freedom in a circuit design can be improved.

It is noted that although the drain of the second MOS transistor S2 in each pixel FC1 is connected to the corresponding one of horizontal address lines X1, X2, - - - , Xm and the source of the first MOS transistor S2 in the same pixel FC1 is connected to the gate of the corresponding first MOS transistor S1, the source of the second MOS transistor S2 in each pixel FC1 may be connected to the corresponding one of the horizontal address lines X1, X2, - - - , Xm and the drain of the second MOS transistor S2 may be connected to the gate of the corresponding first MOS transistor S1 according to a channel type and depletion or enhancement type of the second MOS transistor S2 and according to which logical system of the corresponding horizontal and vertical address lines has been adopted.

It is also noted that although the drain of the first MOS transistor S1 is connected to the anode of the photo diode D and the source of the first MOS transistor S1 is connected to the corresponding one of the data lines DL1, DL2, - - - , DLm, the source of the first MOS transistor S1 may be connected to the anode of the photodiode D and the drain of the first MOS transistor S1 may be connected to the corresponding one of the data lines DL1, DL2, - - - , DLm according to the channel type and depletion or enhancement type of the second MOS transistor S2 and according to which logical system of the corresponding horizontal and vertical address lines have been adopted.

It is of course that the circuit structure of each pixel FC1 is the same.

Second Embodiment

Figure 3:
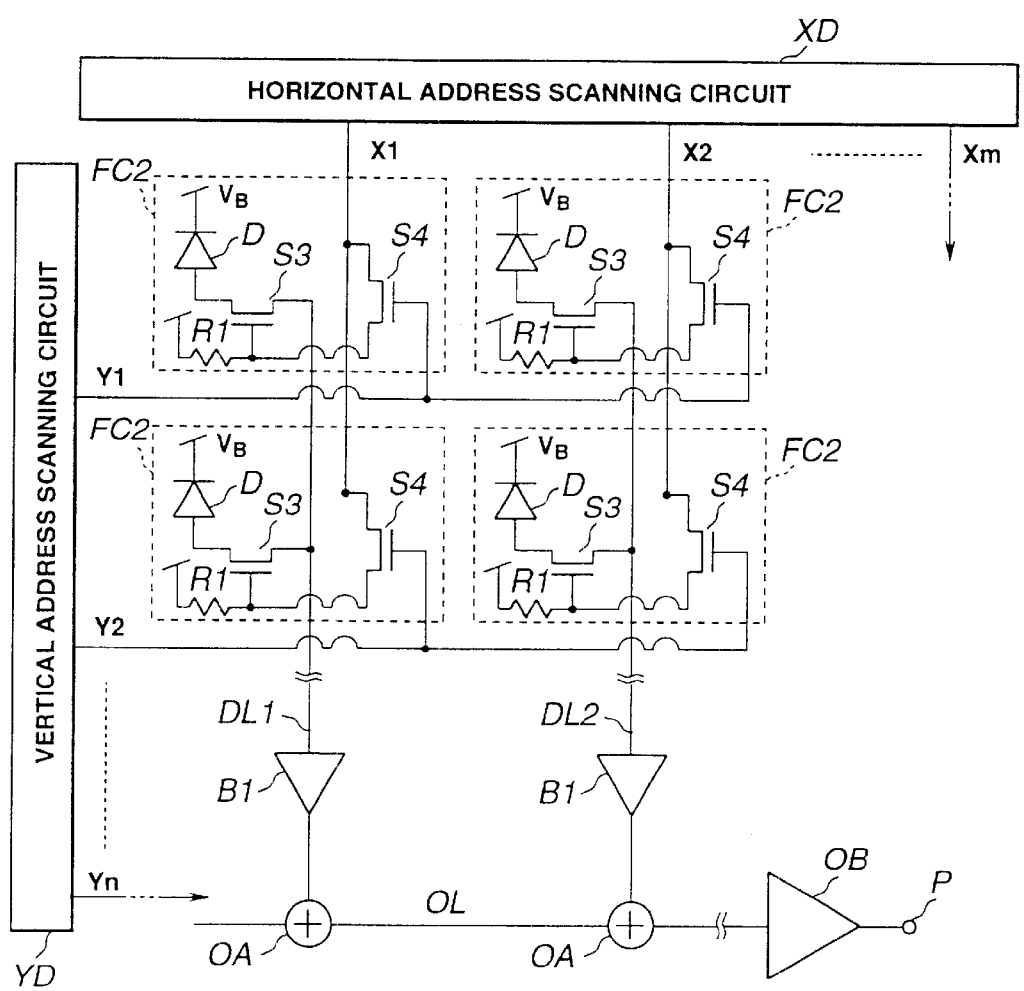
FIG. 3 is a circuit block diagram of the image sensor in a second preferred embodiment according to the present invention.

FIG. 3 shows a second preferred embodiment of the image sensor according to the present invention.

Figure 4:
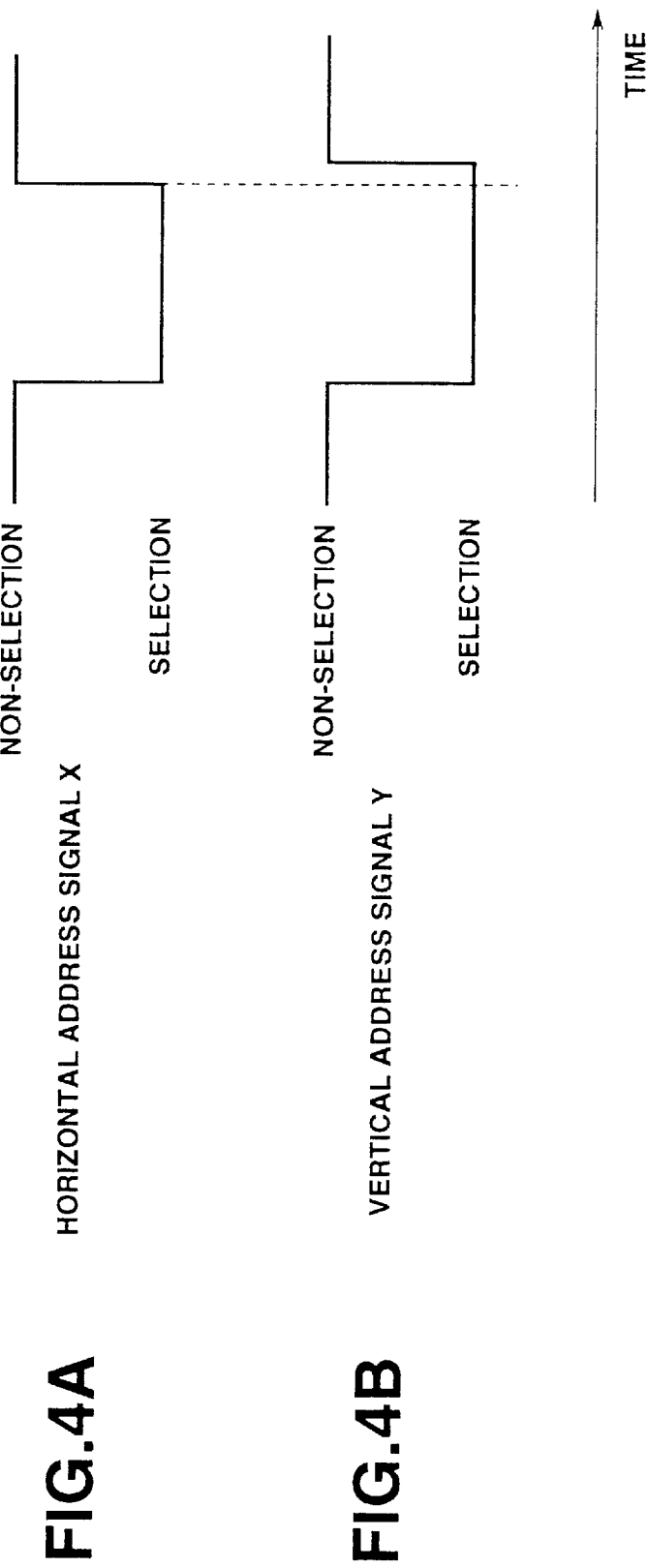
FIGS. 4A and 4B are signal timing charts for explaining the operation of the second embodiment from signals in corresponding ones of horizontal and vertical address lines in the first embodiment in FIG. 1.

FIGS. 4A and 4B integrally show a timing chart of an address selection carried out in the first embodiment shown in FIG. 1 for explaining the operation of the second embodiment.

The structure of the first pixel FC2 in the case of the second embodiment will be described below.

The first pixel FC2 connected to the first vertical address line Y1 and the first horizontal address line X1 includes: the photodiode D as the light receiving element; the first MOS transistor S3 for selectively allowing the photodiode to be connected to the corresponding first data line DL1; the second MOS transistor S4 connected between the first vertical address line X1 and the gate of the first MOS transistor S3; and a resistor R1 connected to the gate of the first MOS transistor S3. The gate of the second MOS transistor S4 is connected to the first vertical address line Y1. The first data line DL1 is connected to the output line OL via the first buffer B1 and via an adder OA. Similarly, the second data line DL2 is connected to the output line OL via the first buffer B1 and via the adder OA.

An operation of the first pixel FC2 in the second embodiment with the resistor R disconnected from the gate of the first MOS transistor S3 will be described below:

If no resistor R1 is connected in the first pixel FC2, the horizontal address line X1 and the vertical address line Y1 are selected so that the charge stored in the photodiode D is outputted to the output line OL in the same manner as the first embodiment shown in FIG. 1.

No problem occurs in the operation which one of the horizontal or vertical address line X1 or Y1 is selected at an earlier timing than the other when the particular pixel FC2 is selected.

However, such a problem as described below occurs when the selected vertical address and horizontal address lines are returned to the non-selected states. That is to say, if the horizontal address line X1 is in the non-selected state at an earlier timing than the vertical address line Y1, the first MOS transistor S3 is turned off so that no problem occurs. However, if the vertical address line Y1 is first returned to the non-selected state, the second MOS transistor S4 is turned off so that the electrical coupling between the gate of the first MOS transistor S3 and the horizontal address line X1 is interrupted.

Hence, even if the horizontal address line X1 is thereafter returned into the non-selected state, the gate charge of the first MOS transistor S3 is left thereat so that the first MOS transistor S3 cannot be turned off any more.

Hence, as shown in FIGS. 4A and 4B, after any one of the horizontal address lines X (X1, X2, - - - , Xm) is in the non-selected state, the corresponding one of the vertical address lines Y (Y1, Y2, - - - , Yn) is needed to be in the non-selected state.

On the other hand, in a case where the resistor R1 is connected as shown in FIG. 3, the resistor R1 provides a way of escape for the gate charge of the first MOS transistor S3.

Consequently, even if the vertical address line Y1 is in the non-selected state at the earlier timing than the horizontal address line X1 and the second MOS transistor S4 is first turned off, the charge in the first MOS transistor S3 can be escaped via the resistor RI to the power supply line VB and the first MOS transistor S3 can be turned off. That is to say, if the resistor R1 is connected, no limitation is present on the control timing when each of the horizontal and vertical address lines is returned to the non-selected state from the selected state.

The resistor R1 forms a pull up circuit when the first MOS transistor S3 is P channel type and forms a pull down circuit when the first MOS transistor S3 is N channel type.

Each adder OA adds an output of the corresponding first buffer B1 to the output line OL.

Since one of the pixels FC2 is selected by means of the vertical and horizontal addresses (x, y), only information of the selected pixel is read on the output line OL.

Since a potential at the gate of the first MOS transistor S3 is equivalent to the potential which is a subtraction of a threshold value of the second MOS transistor S4 from the potential of the first horizontal address line X1 when the corresponding horizontal address line, i.e., the first horizontal address line X1 is selected, the first MOS transistor S3 cannot often sufficiently be turned on although the transistor S4 is turned on. In this case, the turn on of the first MOS transistor S3 can be assured if the potential of the gate of the first MOS transistor S3 when the horizontal address is selected in previously boosted to a higher potential by means of a bootstrap method.

The other structure and operation are the same case those described in the first embodiment shown in FIG. 1.

As described above, since the resistor R1 is added to each pixel FC2, such an unfavorable condition that the first MOS transistor S3 which has once turned on cannot be turned off can be avoided and no limitation is provided on the control timing when the address lines are returned from the selected states to the non-selected states.

In addition, a reading block in the second embodiment is constituted by the first buffers B1 and adders OA so as to separate the data lines from the output line OL, it is not necessary to extend the horizontal address lines up to the output ends of the first buffers B1. Consequently, the whole circuitry can be simplified. Hence, no limitation on the control timing can be provided and the whole circuitry can be simplified in addition to the advantages achieved in the case of the first embodiment.

Third Embodiment

Figure 5:
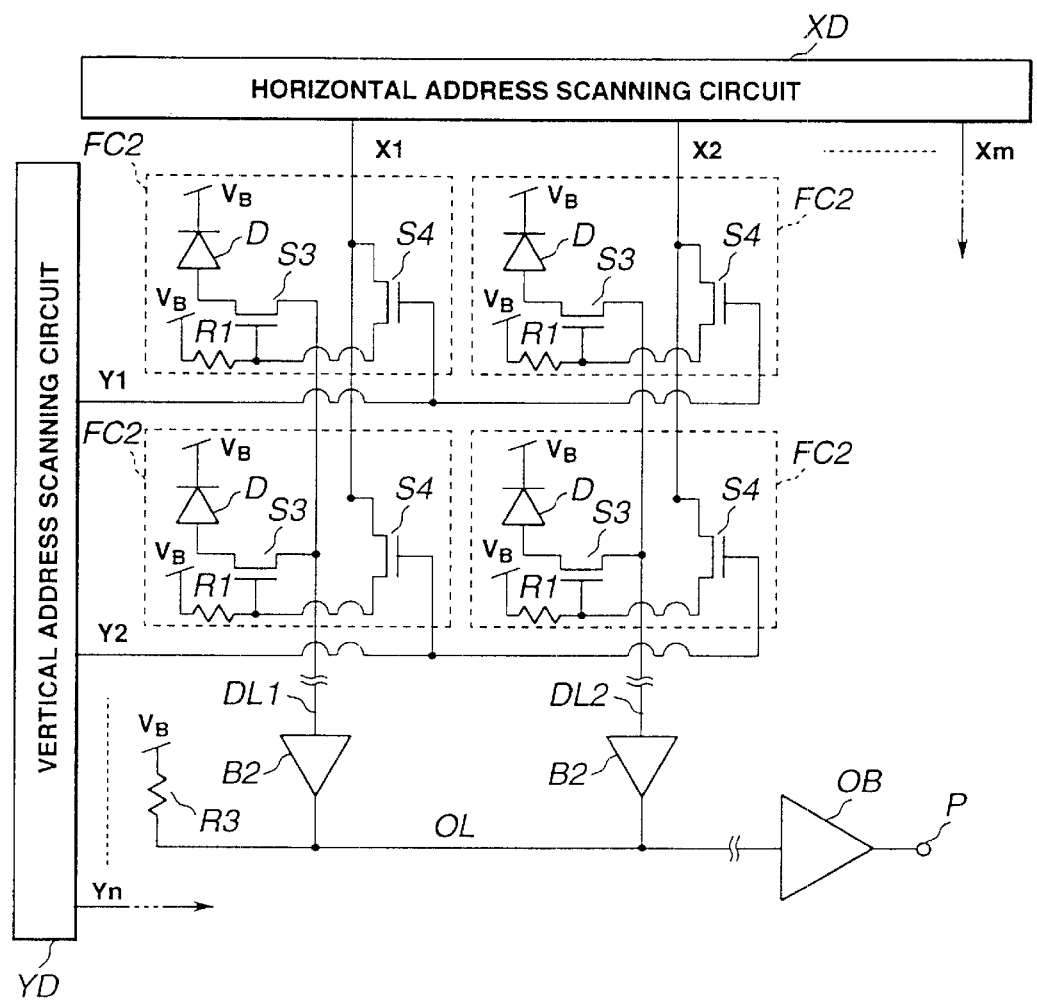
FIG. 5 is a circuit block diagram of the image sensor in a third preferred embodiment according to the present invention.

FIG. 5 shows a whole circuitry of a third preferred embodiment of the image sensor according to the present invention.

Figure 6:
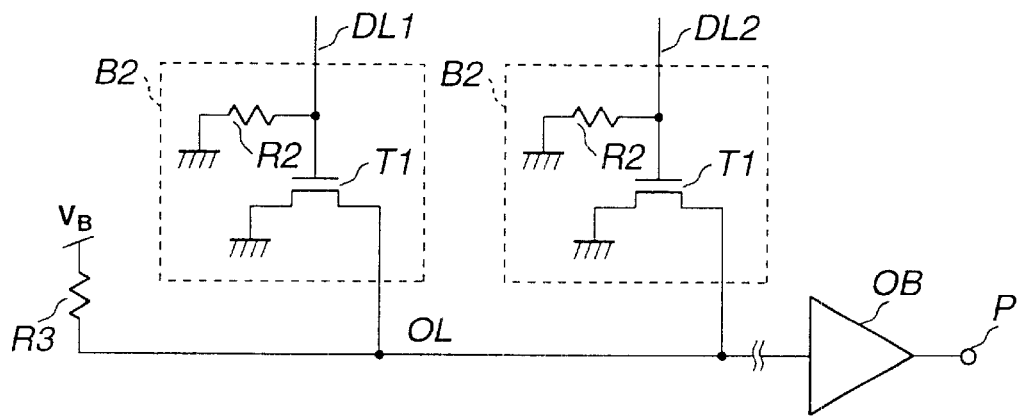
FIG. 6 is a circuit block diagram of a reading block of the image sensor in the third preferred embodiment according to the present invention.

FIG. 6 shows a detailed circuit wiring diagram of the reading block around the data lines DL1 and DL2 and output line OL shown in FIG. 5.

Each pixel FC2 in the third embodiment has the same structure as that in the second embodiment. In the third embodiment, each first buffer B2 in the reading block will be described in details with reference to FIG. 6.

Each first buffer B2 includes: a resistor R2 having a several hundred kΩ whose one end is connected to the corresponding data line, e.g., the first data line DL1 and whose other end is grounded; and a MOS FET type transistor T1 having the gate connected to the one end of the resistor R2, whose drain provides an output of the first buffer B2, and whose source is grounded. Hence, the MOS FET type transistor T1 constitutes a source grounded transistor. In addition, a resistor R3 is connected between the power supply $V_B$ and the other end of the output line OL.

In the third embodiment, the charge in the first pixel FC2 is read on the data line DL1. The read charge is converted into the voltage when it flows into the resistor R2 from the data line DL1 at the corresponding first buffer B2. The converted voltage is applied to the gate of the MOS FET type transistor T1. The current flowing through the transistor T1 is proportional to the converted voltage by means of the resistor R2 (that is to say, the gate voltage). The current proportional to the current flowing through the first data line DL1 flows through the output line OL is converted into the voltage by means of the resistor R3 connected to the output line R3.

Since the resistor R2 in the representative one of first buffers B2 is connected to the first data line DL1, the data line DL1 provides constantly no high impedance state and the input impedance of each corresponding first buffer B2 is low.

In addition, since the transistor T1 in each first buffer B2 constitutes the source grounded transistor circuit, the impedance of the transistor T1 as viewed from the drain thereof is as high as exceeding several ten megaohms (MΩ). Consequently, the output impedance of each first buffer B2 indicates the high impedance.

Therefore, since the output end of each of the first buffers B2 is directly (uninterruptedly) connected to the output line OL and the output of each of the first buffers B2 provides a multiple input OR connection for the output line OL. A current proportional to the current flowing through one of the data lines corresponding to the selected pixel FC2 is caused to flow through the output line OL.

In addition, this current is hardly caused to flow through the other first buffers B2. The current flowing through the output line OL is converted into the voltage.

The other structure and operation are the same as those in the second embodiment shown in FIG. 3.

The same advantages as the second embodiment can be achieved. Since the data lines DL and the output line OL can be connected only via the corresponding first buffers B2, the more simplification of the circuit con figuration can be achieved.

It is noted that although the reading block having the first buffers B2 has been described in each of the first, second, and third embodiments, the reading block having current or voltage amplifiers for the respective data lines may be used to improve a sensitivity of reading.

Fourth Embodiment

Figure 7:
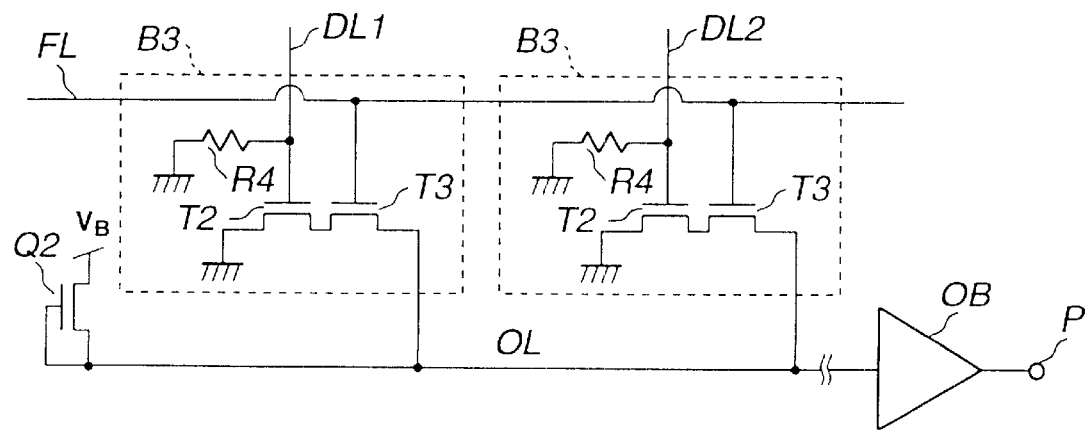
FIG. 7 is a circuit block diagram of the reading block of the image sensor in a fourth preferred embodiment according to the present invention.

FIG. 7 shows the reading block of a fourth preferred embodiment of the image sensor according to the present invention. Each pixel in the fourth embodiment is the same as that in the second embodiment shown in FIG. 3.

The reading block is constituted by each first buffer B3.

For example, the representative one of the first buffers B3 connected to the first data line DL1 includes: a resistor R4 connected between the first data line DL1 and the ground; a fourth MOS FET T2 whose gate is connected to the first data line DL1 and whose source is grounded; and a fifth MOS FET T3 whose gate is connected to a fixed potential line FL, whose drain is connected to the output line OL, and whose source is connected to the drain of the fourth MOS FET T2.

It is noted that a sixth MOS FET Q2 having the gate connected to the drain thereof and the source thereof connected to a fixed potential such as the plus power supply $V_B$ is connected to the output line OL. That is to say, the sixth MOS FET Q2 constitutes an active MOS resistor. The sixth MOS FET Q2 in the fourth embodiment is a p-channel enhancement active resistor.

In the fourth embodiment, the current proportional to the current flowing through the first data line DL1 is caused to flow through the output line OL and the sixth MOS FET Q2 connected to the output line OL serves to convert this current flowing through the output line OL into the corresponding voltage.

Since the resistor R4 is connected to the first data line DL1, the first data line DL1 does not provide the high impedance state and the input impedance of each first buffer B3 is low.

In addition, since both of fourth and fifth transistors T2 and T3 are in a cascode configuration, the impedance of the cascode connected transistors T2 and T3 viewed from the drain of the fifth MOS FET T3 is higher than that viewed from the drain of the fourth MOS FET T2.

Hence, the output impedance of each of the first buffers B3 can directly (uninterruptedly) be connected to the output line OL. The outputs of the respective first buffers B3 provide the multiple input OR connection (wired OR). The current proportional to the current flowing through the first data line DL1 is caused to flow through the output line OL and is converted into the corresponding voltage. Since the cascode connection of the fourth and fifth MOS FETs is adopted in each of the first buffers B3, a response speed of each first buffer B3 can be improved. Furthermore, an amplification factor is improved since the sixth MOS FET Q2 is used as the active resistor in place of the corresponding resistor, e.g., R3 in the third embodiment.

The same advantages as those in the third embodiment can be achieved. Furthermore, since the output impedance of each of the first buffers B3 is more increased, an accuracy of the current-to-voltage conversion in the output line OL can be improved. In addition, the response speed described above can be improved.

Fifth Embodiment

Figure 8:
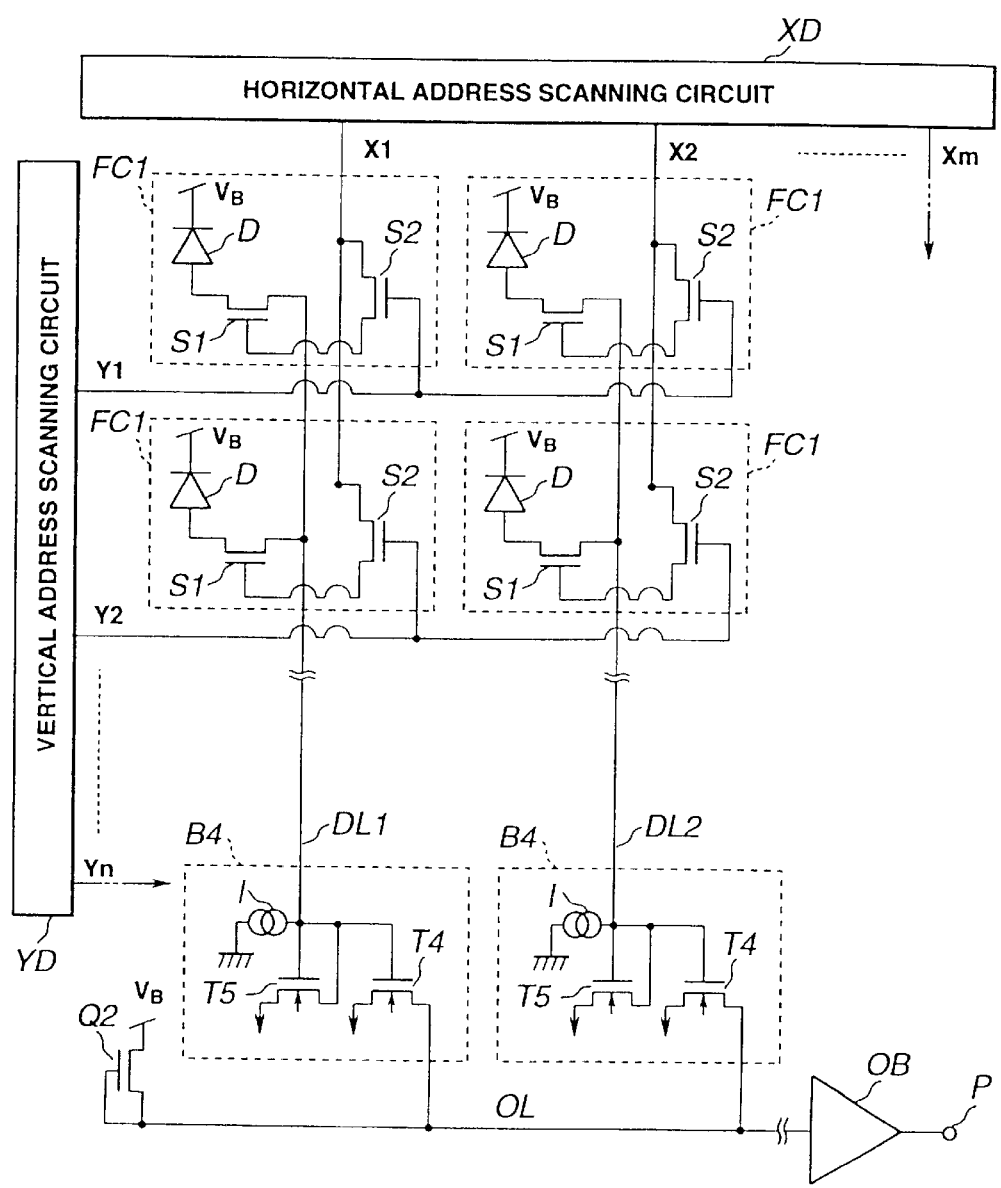
FIG. 8 is a circuit block diagram of the image sensor in a fifth preferred embodiment according to the present invention.

FIG. 8 shows a fifth preferred embodiment of the image sensor according to the present invention.

The reading block in the fifth embodiment is constituted by each first buffer B4 shown in FIG. 8.

A representative one of the first buffers B4 connected to the first data line DL1 includes: a seventh MOS FET T4 whose gate is connected to the first data line DL1, whose drain is connected to the output line OL, and whose source is connected to a fixed potential equal to the ground potential or lower, an eighth MOS FET T5 whose gate is connected to the first data line DL1. whose drain is connected to its gate, and whose source is connected to the fixed potential line equal to the ground potential or lower which is the same as the source of the seventh MOS FET T4; and a current source I connected between the first data line OL1 and the ground.

Each pixel in the fourth embodiment is the same as that in the first embodiment shown in FIG. 1.

In the fifth embodiment, in each first buffer B4, a current mirror circuit is constituted by both of the seventh and eighth transistors T4 and T5 and is biased by the current source 1. The current flowing through the first data line DL1 is caused to flow through the eighth MOS FET T5 and the current proportional to the current flowing through the eighth MOS FET T5 is caused to flow through the seventh MOS FET T4. Hence, the current proportional to the current flowing in the first data line DL1 is caused to flow through the output line OL and is converted into the voltage by means of the sixth MOS FET Q2.

Since, in each first buffer B4, the drain and gate of the eighth MOS FET T5 and the current source I are connected to the corresponding one of the data lines DL (DL1, DL2, - - - , DLm), each data line does not indicate the high impedance state and its input impedance of each first buffer B4 is low.

In addition, both of the seventh and eighth MOS FETs T4 and T5 are constituted by the current mirror circuit. The output impedance of the current mirror circuit is so high that the output ends of each first buffer B4 can directly be connected to the output line OL to provide the multiple input OR connection (wired OR).

The other structure and operation are the same as those described in the fourth embodiment shown in FIG. 7. The use of the current mirror circuit permits the improvement in a current pick-up accuracy and improves a reading accuracy.

In the fifth embodiment, the current mirror circuit is used in each first buffer B4. Alternatively, a cascode current mirror circuit may be used or Wilson current mirror circuit may be used in each first buffer B4.

The cascode current mirror circuit and Wilson current mirror circuit are exemplified by pages 333 through 353 of Section 5.3 CURRENT MIRRORS/AMPLIFIERS of a book titled VLSI DESIGN TECHNIQUES FOR ANALOG AND DIGITAL CIRCUITS authored by Randall L. Geiger et al. and published by McGraw Hill Publishing Company in 1990 (the disclosure of which are herein incorporated by reference).

Alternatively, a combination of the current mirror circuit and the cascode circuit may be used in each first buffer B4. In this alternative case, an accuracy of the current-to-voltage conversion and a response speed can be improved.

Sixth Embodiment

Figure 9:
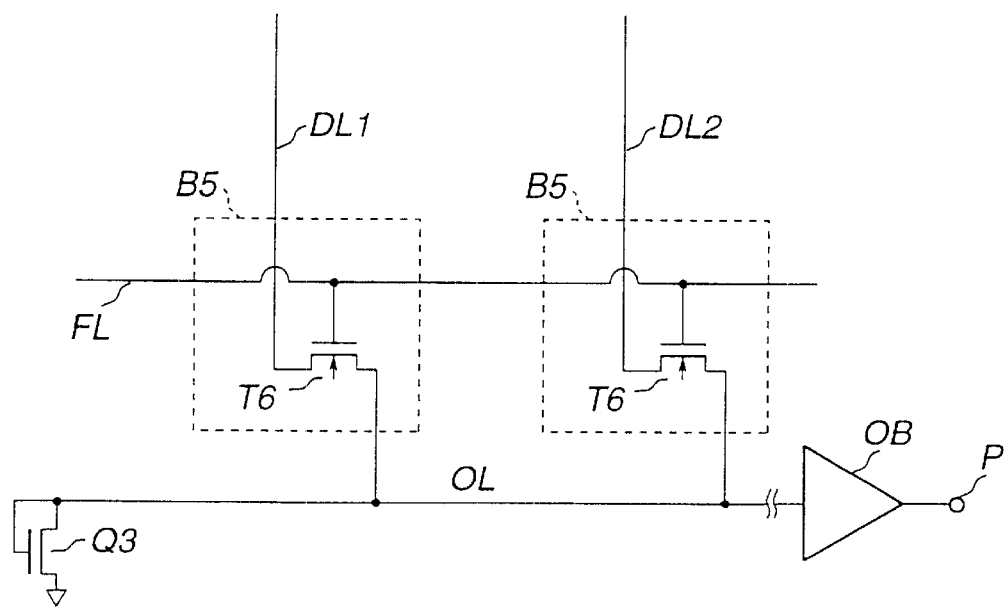
FIG. 9 is a circuit block diagram of the reading block of the image sensor in a sixth preferred embodiment according to the present invention.

FIG. 9 shows the reading block of a sixth preferred embodiment of the image sensor according to the present invention.

The reading block of the image sensor in the sixth embodiment is constituted by each first buffer B5 shown in FIG. 9.

In a representative one of the first buffers B5, the first data line DL1 is connected to the source of a ninth MOS FET T6.

A gate of the ninth MOS FET T6 is connected to the fixed potential line FL and the drain of the ninth MOS FET T6 is connected to the output line OL. The output line OL is connected to the active resistor of a tenth MOS FET Q3.

It is noted that the drain of the tenth MOS FET Q3 is connected to its gate thereof Q3 and the source thereof is connected to the ground potential or negative potential lower than the ground potential.

The other structure is the same as that described in each of the first and fifth embodiments.

In the sixth embodiment, since the transistor T6 is of a gate grounded transistor configuration, the current flowing in the first data line DL1 is caused to flow through the source and drain of the ninth MOS FET T6 and in the output line OL.

Since, in each first buffer B5, the impedance of the transistor of the ninth MOS FET T6 viewed from the source of the transistor T6 is so low that the impedance of the first data line DL1 does not indicate the high impedance of each first buffer B5.

In addition, since the impedance of the ninth MOS FET T6 viewed from the drain thereof is high, the output ends of the respective first buffers B5 can directly be connected to the output line OL and the outputs of the respective first buffer B5 provide the multiple input OR connection for the output line OL. The current proportional to that flowing in each of the data lines DL1, DL2, - - - , DLm is converted into the voltage by means of the tenth MOS FET Q3.

Since the gate grounded transistor circuit has the source current equal to the drain current, the current pick up accuracy is improved. In addition, the number of circuit elements constituted by each first buffer B5 is reduced and is only one, i.e., the ninth MOS FET T6. Furthermore, since a signal delay due to a Miller effect that the mirror circuit, e.g., shown in FIG. 8 has, the response speed can be increased.

The same advantages as the third embodiment can be achieved. Due to the use of the gate grounded configured MOS FET, the output reading accuracy is improved, the circuit construction can be simplified, and the response speed can be improved.

Seventh Embodiment

Figure 10:
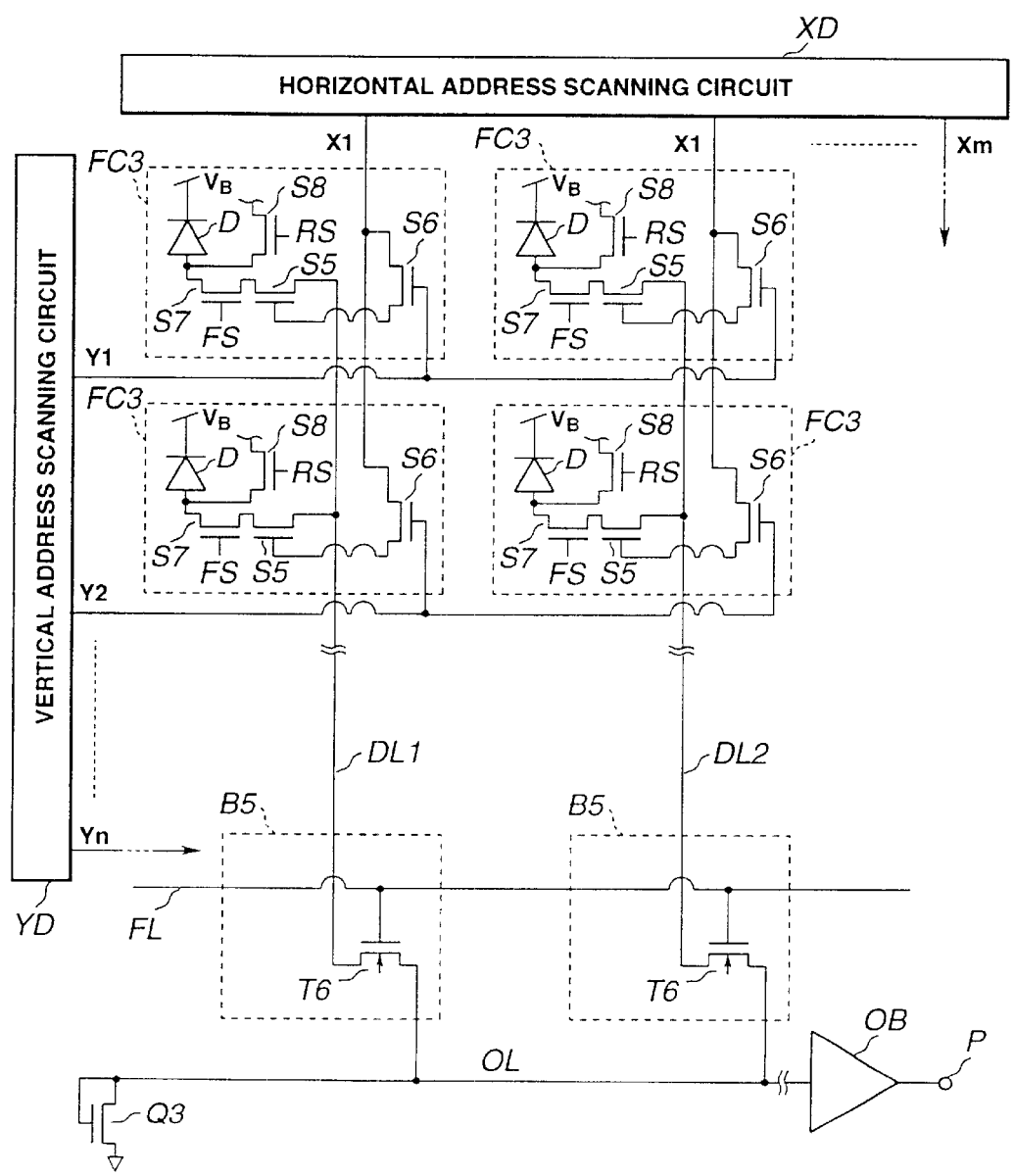
FIG. 10 is a circuit block diagram of the image sensor in a seventh preferred embodiment according to the present invention.

FIG. 10 shows a seventh preferred embodiment of the image sensor according to the present invention.

In the seventh embodiment, each pixel FC3 includes: the light receiving element such as the photodiode D; the first switching MOS transistor S5 for selectively connecting the photodiode D to the corresponding data line; the second MOS transistor S6 for selectively connecting the corresponding pixel FC3 (photodiode D in the same pixel) to the corresponding vertical address line; an eleventh switching MOS transistor S7 used for a frame transfer; and a twelfth switching MOS transistor S8 for selectively resetting the photodiode D.

The structure of the first pixel FC3 connected to the first horizontal and vertical address lines X1 and Y1 will be described below.

A source of the second MOS transistor S6 is connected to the first horizontal address line X1 and the gate of the second MOS transistor S6 is connected to the first vertical address line Y1. The gate of the first MOS transistor S5 is connected to the drain of the second MOS transistor S6. The eleventh MOS transistor S7 is interposed between the photodiode D and the first MOS transistor S5. The gate of the eleventh MOS transistor S7 receives a frame shift signal FS. The gate of the twelfth MOS transistor S8 receives a reset signal RS. One of the remaining electrodes of the twelfth MOS transistor S8 is connected to a reset potential line such as the plus power supply line.

The above-described structure of the first pixel FC3 is also applicable to one of the other pixels FC3.

In the seventh embodiment, the composite address is generated by means of the corresponding second MOS transistor S6. The first MOS transistor S5 serves to connect the photodiode D to the data line DL1. When the frame shift signal FS is inputted to the gate of the eleventh MOS transistor S7, the charge stored in each pixel FC3 is transferred.

Furthermore, when the reset signal RS is inputted to the twelfth MOS transistor S8, the anode of the photodiode D is connected to the reset potential so that the photodiode D is reset. It is noted that the frame shift signal FS to the gate of the eleventh MOS transistor S7 is applied to all of the eleventh MOS transistors S7 of all pixels FC3 and the reset signal RS to the gate of the twelfth MOS transistor S8 is applied to all of the eleventh MOS transistors S8 of all pixels FC3.

It is noted that the structure of the reading block in the seventh embodiment is the same as described in the sixth embodiment with reference to FIG. 9.

The same advantages as described in the first embodiment can be achieved and the frame transfer becomes possible. In addition, the resetting of the photodiode D is possible and an electronic shutter can be achieved. A more practical convenience can be increased.

It is noted that, although in each embodiment, the cathode of the photodiode D is connected to the fixed potential, e.g., the plus voltage supply VB, the anode of the photodiode D may be connected to the fixed potential and either of the electrodes of the photodiode D may be connected to the fixed potential.

Eighth Embodiment

Figure 11:
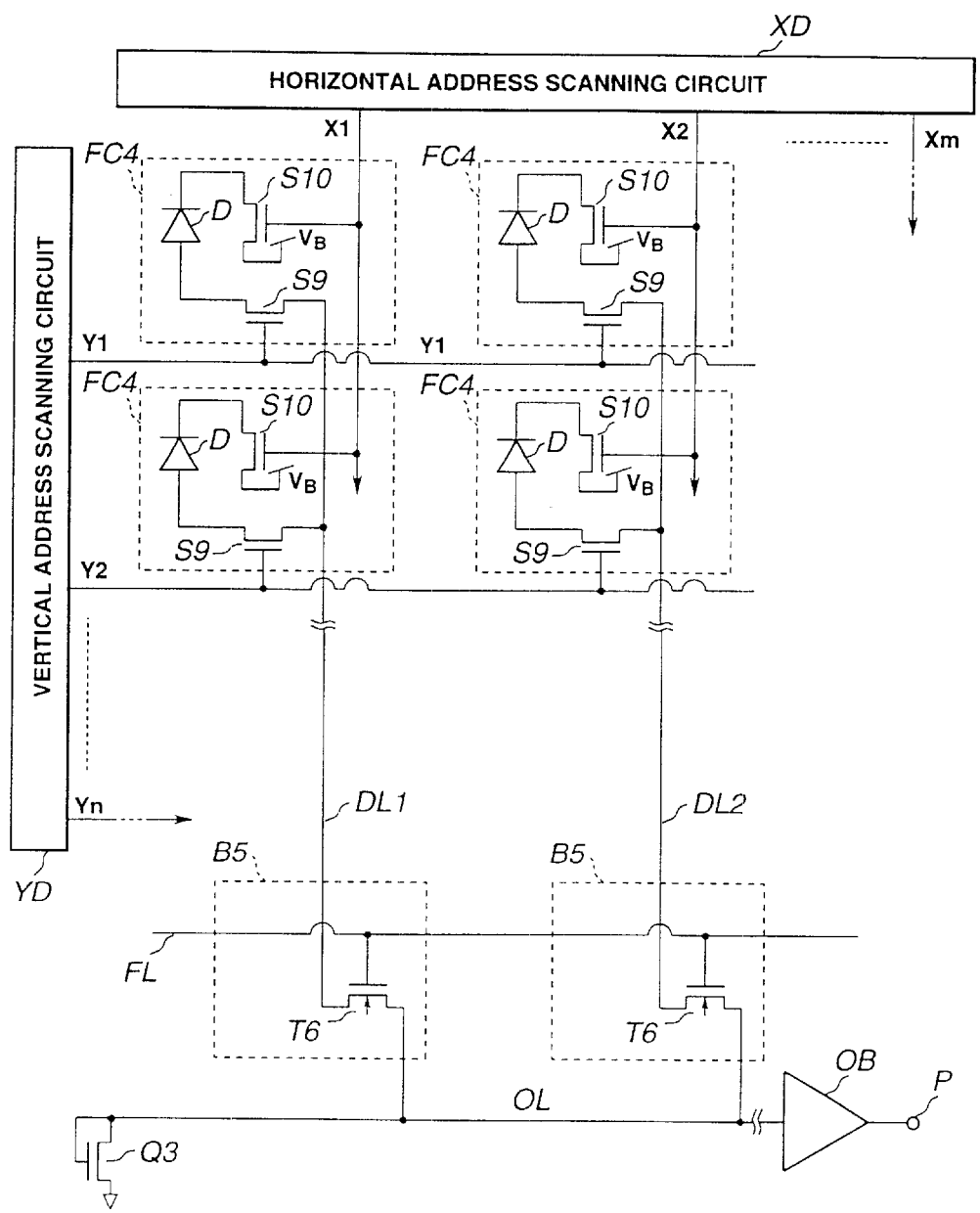
FIG. 11 is a circuit block diagram of the image sensor in an eighth preferred embodiment according to the present invention.

FIG. 11 shows a structure of each pixel in an eighth preferred embodiment of the image sensor according to the present invention.

In each pixel FC4 of the eighth embodiment, the anode of the light receiving element of the photodiode D is connected to the corresponding data line, e.g. the first data line DL1 via a thirteenth switching MOS transistor S9 and the cathode of the photodiode D is connected to the fixed potential via a fourteenth MOS transistor S10.

The gate of the thirteenth MOS transistor S9 is connected to the first vertical address line Y1 and the gate of the fourteenth MOS transistor S10 is connected to the first horizontal address line X1.

In the eighth embodiment, it is not necessary to connect each photodiode D in the corresponding one of the pixels FC4 to the fixed potential in a case wherein such an insulating substrate as silicon on insulator (SOI) is used as a substrate and the respective MOS transistors S9 and S10 function simultaneously as the selective operations of the generation of the composite address and of the connections of the photodiodes to the data lines. The charge of one of the pixels whose connected horizontal and vertical address lines are simultaneously selected is transmitted to the corresponding data line DL1.

The reading block in the eighth embodiment is the same as that in the sixth or seventh preferred embodiment.

The same advantages as those described in the first embodiment can be achieved. In addition, since it is unnecessary to connect either of the electrodes of the photodiode to the fixed potential, a degree of freedom in the circuit design can be increased. When each pixel is used as a pixel for an image processing, each pixel can be miniaturized and a resolution of the image can be increased.

It is noted that although, the structure of the reading portion B5 in each of the seventh and eighth embodiments is the same as that in the sixth embodiment, each pixel in either of the seventh and eighth embodiments may be combined with any one of the reading portions B1–B4 in the first, second, third, fourth, and fifth embodiments.

Others

Figure 12:
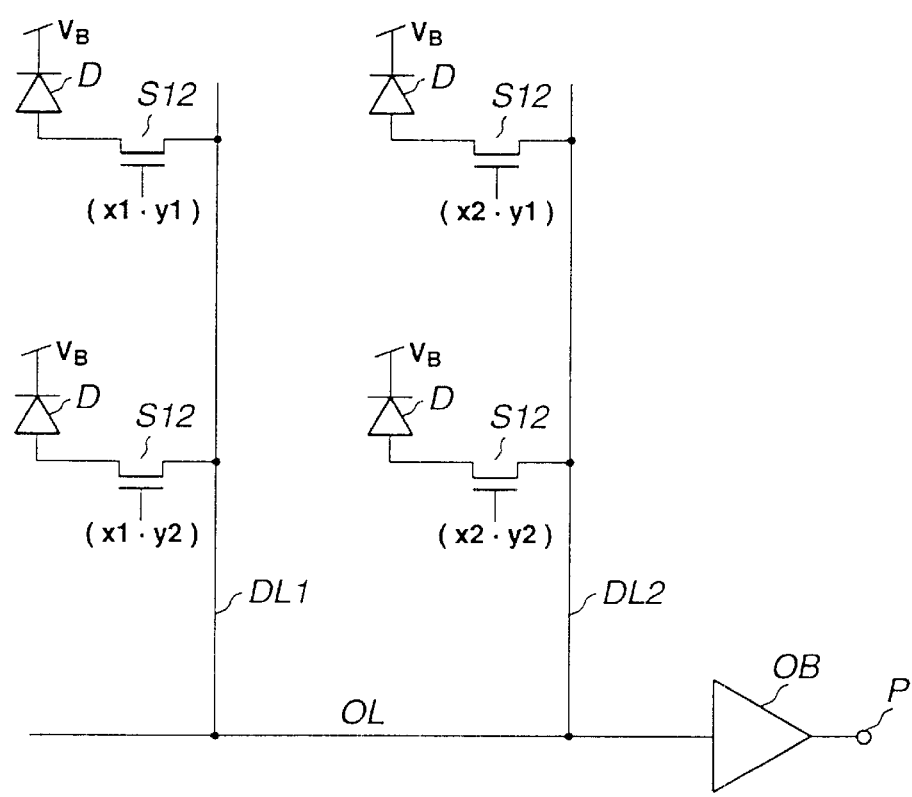
FIG. 12 is a circuit block diagram of the image sensor for explaining a horizontal address and a vertical address of each pixel.

FIG. 12 shows a general concept of the composite addresses (x1, y1), (x2, y1), - - - , (xm, y1), (x1, y2), (x2, y2),- - - ,(xm, y2), - - - - (xm, yn) allocated to the pixels in the image sensor.

As shown in FIG. 12, the switching element such as a transistor S12 is arranged for each pixel as the switching element for connecting the light receiving element to each corresponding one of the data lines and this switching element S12 is controlled by means of the composite address of the horizontal and vertical addresses (xi, yj) (i=1, 2, - - - , m, j=1, 2, - - - , n). Hence, each pixel can be read independently of each other and the random access can be achieved.

If the data lines DL1, DL2, - - - DLm (or DLn) were uninterruptedly connected to the output line as shown in FIG. 12 without intervention of each selecting transistor in the previously proposed image sensor, a parasitic capacitance on the output line would be increased. That is to say, if all of the data lines were uninterruptedly connected to the output line OL, the parasitic capacitance of the switching elements in all pixels would act as the parasitic capacitance of the output line and the parasitic capacitance of the output line would become large and the response speed would become slow. For example, the number of the pixels is 512×512, the parasitic capacitances of 512×512 number switching elements are connected to the data lines. In the previously proposed image sensor described in the BACKGROUND OF THE INVENTION, the switching elements connected to the output line are 512×2. Hence, the parasitic capacitance of the output line shown in FIG. 12 is 256 times (=(512×512)/(512×2)) as many as the previously proposed image sensor. However, in the image sensor according to the present invention, since the data lines are connected to the output line via the reading block (reading means) having a predetermined low input impedance with respect to each data line. Hence, the data line does not indicate the high impedance state and the false signals such as the smear and shading to be developed due to the image sensor structure can be prevented.

The switching element is divided into a first switching element and a second switching element so that each pixel can simply be structured using transistors for the respective first and second switching elements. A discharger is provided for each pixel to discharge the first switching transistor. Consequently, the first transistor when neither the corresponding horizontal address nor vertical address line is selected is discharged.

Figure 13:
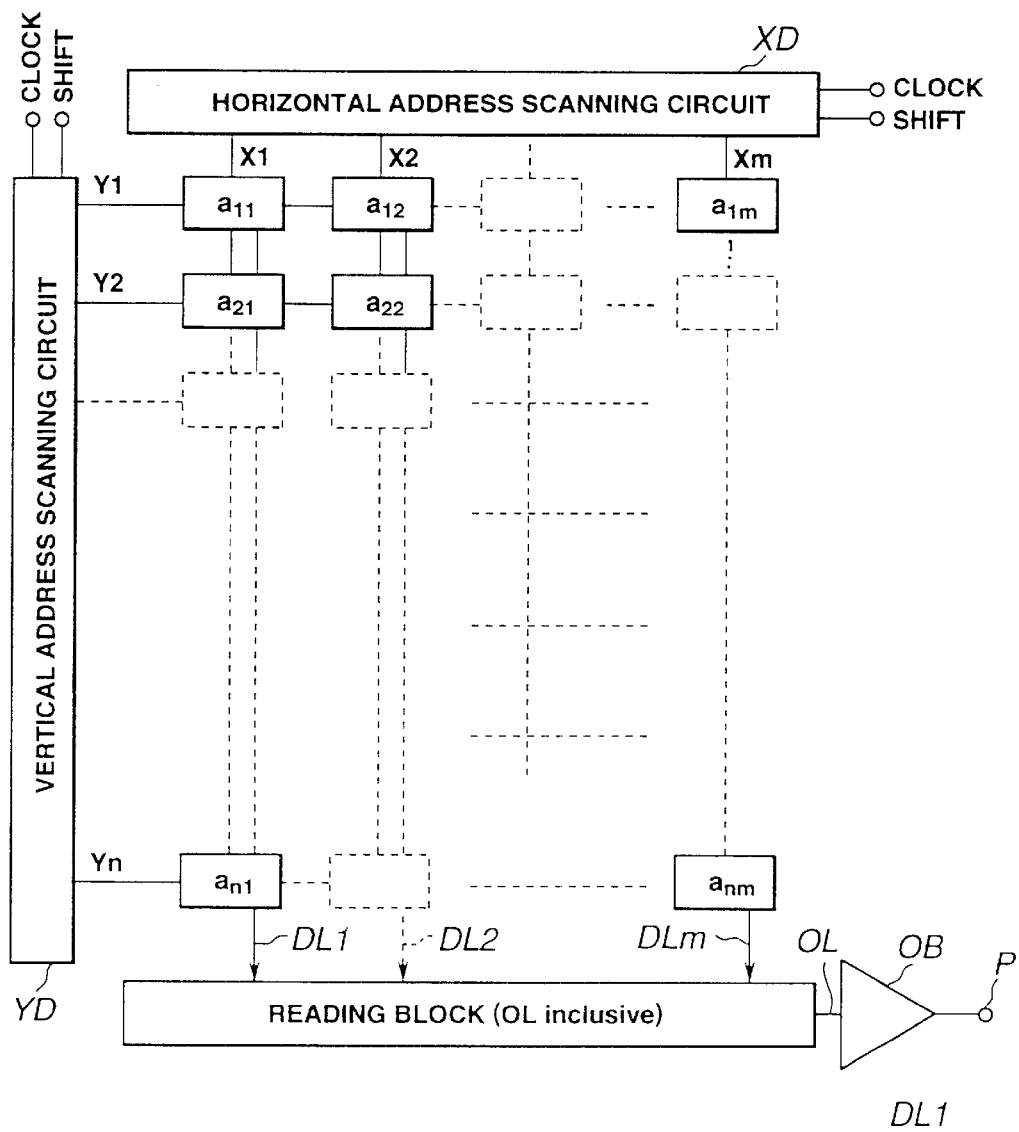
FIG. 13 is a whole configuration of the image sensor for explaining matrix formed pixels of the image sensor according to the present invention.

FIG. 13 shows another general concept of the image sensor for explaining the designation of the horizontal and vertical addresses allocated to the respectively corresponding pixels.

In FIG. 13, the plurality of the pixels are formed in the matrix form as follows: $a_{11}, a_{12}, ---, a_{1m}, a_{21}, a_{22}, a_{2m}, a_{n1}, a_{n2}, ---, a_{nm}$.

The first vertical address line Y1 is connected to a first row of the pixels ($a_{11}, a_{12}, ---, a_{1m}$). The second vertical address line Y2 is connected to a second row of the pixels ($a_{21}, a_{22}, ---, a_{2m}$). The n-th number address line Yn is connected to an n-th number row of the pixels ($a_{n1}, a_{n2}, ---, a_{nm}$). The first horizontal address line XI is connected to a first column of the pixels ($a_{11}, a_{21}, ---, a_{n1}$). The second horizontal address line X2 is connected to a second column of the pixels ($a_{12}, a_{22}, ---, a_{n2}$). The m-th number horizontal address line Xm is connected to an n-th number column of the pixels ($a_{1m}, a_{2m}, ---, a_{nm}$). Hence, the composite address of the horizontal and vertical addresses is allocated to each pixel ($a_{11}, a_{12}, ---, a_{1m}, a_{21}, a_{22}, ---, a_{n1}, ---, a_{nm}$). The data lines DL1, DL2, ---, DLm, are juxtaposed to the respectively corresponding horizontal address lines (X1, X2, ---, Xm) or to the respectively corresponding vertical address lines (Y1, Y2, ---, Yn). It is noted that each pixel ($a_{11, 12}, ---, a_{1m}, a_{21, 22}, ---, a_{2m}, ---, a_{n1}, ---, a_{nm}$) corresponds to FC1 in FIGS. 1, 2, or 8, corresponds to FC2 in FIGS. 3 or 4, corresponds to FC3 in FIG. 10, or corresponds to FC4 in FIG. 11.

Although the vertical address scanning circuit YD constituted by the shift register is connected to the vertical address lines (Y1, Y2, ---, Yn), another circuit which can designate any one of the vertical addresses randomly may be connected to the respective vertical address lines. The same alternative is applicable to the horizontal address scanning circuit. The reading block in FIG. 13 corresponds to B1 and Q1 in FIG. 1, corresponds to B1A and Q1A in FIG. 2, corresponds to B1 and OA in FIG. 3, corresponds to B2 and R3 in FIG. 5, corresponds to B2 and R3 in FIG. 6, corresponds to B3 and Q2 in FIG. 7, corresponds to B4 and Q2 in FIG. 8, or corresponds to B5 and Q3 in FIG. 9, 10, or 11.

It is noted that the output terminal P in each embodiment is connected to an image processing apparatus which is exemplified by a U.S. Pat. No. 5,548,413 issued on Aug. 20, 1996 (, the disclosure of which is herein incorporated by reference). It is also noted that a clock pulse and a shift command are inputted to the horizontal and vertical address scanning circuits XD and YD.

It is noted that the term of the buffer includes the current amplifier and the voltage amplifier.

What is claimed is:

1. An image sensor comprising:

a plurality of data lines;

a plurality of pixels arranged in a two-dimensional form, each pixel to which both a horizontal address and a vertical address are allocated and including a light receiving element and a switching element for drivingly connecting the light receiving element to one of the data lines which is connected to the same pixel;

a plurality of horizontal address lines, each horizontal address line being connected to the pixels to which the same horizontal address is allocated;

a plurality of vertical address lines, each vertical address line being connected to the pixels to which the same vertical address is allocated, the switching element connecting the light receiving element in the same pixel to one of the data lines which is connected to the same pixel when both of the horizontal address and the vertical address allocated to the same pixel are assigned through one of the horizontal address lines which is connected to the same pixel and one of the vertical address lines which is connected to the same pixel;

an output line connected to the data lines and having one end serving as an output terminal; and a reading block interposed between each of the data lines and the output line and having a predetermined low input impedance with respect to a connection of an input end thereof to each of the data lines, wherein the switching element in each pixel comprises: a first switching element for drivingly connecting the light receiving element in the same pixel to the one of the data lines which is connected to the same pixel; and a second switching element for forcefully turning the first switching element to a conducted state so that the light receiving element is connected to the one of the data lines which is connected to the same pixel when both of the one of the horizontal address lines which is connected to the same pixel and the one of the vertical address lines which is connected to the same pixel become active so as to assign the horizontal address and the vertical address allocated to the same pixel, and wherein the second switching element comprises a transistor having a drive electrode connected to either one of the one of the horizontal address lines which is connected to the same pixel or the one of the vertical address lines which is connected to the same pixel, a first electrode connected to the other of the one of the horizontal address lines which is connected to the same pixel or the one of the vertical address lines which is connected to the same pixel, a second electrode connected to a drive electrode of the first switching element.

2. An image sensor as claimed in claim 1, which further comprises a discharger connected to the first switching element for discharging the first switching element when neither the one of the horizontal address lines which is connected to the same pixel nor the one of the vertical address lines which is connected to the same pixel becomes active.

3. An image sensor as claimed in claim 2, wherein the light receiving element is a photodiode, the first switching element comprises a transistor having the drive electrode connected to the second electrode of the transistor of the second switching element, a first electrode connected to the photodiode, and a second electrode connected to the corresponding one of the data lines which is connected to the same pixel, and the discharger comprises either a resistor or a current source via which the drive electrode of the transistor of the first switching element is connected to a fixed potential.

4. An image sensor as claimed in claim 3, wherein the data lines are juxtaposed to the horizontal address lines.

5. An image sensor as claimed in claim 3, wherein the data lines are juxtaposed to the vertical address lines.

6. An image sensor comprising:
a plurality of data lines;
a plurality of pixels arranged in a two-dimensional form, each pixel to which both a horizontal address and a vertical address are allocated and including a light receiving element and a switching element for drivingly connecting the light receiving element to one of the data lines which is connected to the same pixel;
a plurality of horizontal address lines, each horizontal address line being connected to the pixels to which the same horizontal address is allocated;
a plurality of vertical address lines, each vertical address line being connected to the pixels to which the same vertical address is allocated, the switching element connecting the light receiving element in the same pixel to one of the data lines which is connected to the same pixel when both of the horizontal address and the vertical address allocated to the same pixel are assigned through one of the horizontal address lines which is connected to the same pixel and one of the vertical address lines which is connected to the same pixel;
an output line connected to the data lines and having one end serving as an output terminal; and
a reading block interposed between each of the data lines and the output line and having a predetermined low input impedance with respect to a connection of an input end thereof to each of the data lines,
wherein the light receiving element comprises a photodiode and the switching element comprises a first transistor for operatively connecting an anode of the photodiode to the corresponding one of the data lines which is connected to the same pixel and a second transistor for operatively connecting a cathode of the photodiode to a fixed potential, a drive electrode of the first transistor being connected to either one of the corresponding one of the horizontal address lines which is connected to the same pixel or the corresponding one of the vertical address lines which is connected to the same pixel and a drive electrode of the second transistor being connected to the other of the corresponding one of the horizontal address lines which is connected to the same pixel or the corresponding one of the vertical address lines which is connected to the same pixel.

7. An image sensor as claimed in claim 4, wherein the reading block comprises a first buffer connected to each of the data lines and having the predetermined low input impedance and a selector connected between the first buffer and the output line for selectively connecting an output end of the first buffer to the output line when the one of the horizontal address lines which is connected to the same pixel becomes active so as to assign the horizontal address allocated to the same pixel.

8. An image sensor as claimed in claim 5, wherein the reading block comprises a first buffer connected to each of the data lines and having the predetermined low input impedance and a selector connected between the first buffer and the output line for selectively connecting an output end of the first buffer to the output line when the corresponding one of the vertical address lines becomes active so as to assign the vertical address allocated to the same pixel.

9. An image sensor as claimed in claim 4, wherein the reading block comprises a first buffer connected to each of the data lines and having the predetermined low input impedance and an adder for connecting an output end of the first buffer to the output line when the light receiving element in the same pixel is connected to the corresponding one of the data lines which is connected to the same pixel via the switching element in the same pixel.

10. An image sensor as claimed in claim 4, wherein the reading block comprises an amplifier connected between each corresponding one of the data lines and the output line and having the predetermined low input impedance and a predetermined high output impedance.

11. An image sensor as claimed in claim 10, wherein the amplifier comprises a source grounded transistor circuit.

12. An image sensor as claimed in claim 10, wherein the amplifier comprises a current mirror circuit.

13. An image sensor as claimed in claim 10, wherein the amplifier comprises a gate grounded transistor circuit.

14. An image sensor as claimed in claim 11, wherein the output line comprises a resistor connected between a fixed potential and the other end of the output line and a second buffer interposed between the output line and the one end of the output line.

15. An image sensor as claimed in claim 12, wherein the output line comprises an active resistor connected between a fixed potential and the other end of the output line.

16. An image sensor as claimed in claim 13, wherein the output line comprises an active resistor connected between a fixed potential and the other end of the output line.

17. An image sensor as claimed in claim 10, wherein the predetermined low input impedance of the amplifier is in an order of several hundred kiloohms.

18. An image sensor as claimed in claim 17, wherein the predetermined high output impedance of the amplifier is in an order of several ten megaohms.

19. An image sensor comprising:
a plurality of data lines;
a plurality of pixels arranged in a two-dimensional form, each pixel to which both of a horizontal address and a vertical address are allocated and including an optical-and-electrical converting means for converting an incident light quantity into a corresponding electrical charge and a switching element means for drivingly connecting the optical-to-electrical converting means to one of the data lines which is connected to the same pixel;
a plurality of horizontal address lines, each horizontal address line being connected to the pixels to which the same horizontal address is allocated;
a plurality of vertical address lines, each vertical address line being connected to the pixels to which the same vertical address is allocated, the switching means connecting the optical-to-electrical converting means in the same pixel to one of the data lines which is connected to the same pixel when both of the horizontal address and the vertical address allocated to the same pixel are assigned through one of the horizontal address lines which is connected to the same pixel and one of the vertical address lines which is connected to the same pixel;

an output line connected to the data lines and having one end serving as an output terminal; and reading means interposed between each of the data lines and the output line and having a predetermined low input impedance with respect to a connection of an input end thereof to each of the data lines, wherein the switching element means in each pixel comprises: a first switching element for drivingly connecting the light receiving element in the same pixel to the one of the data lines which is connected to the same pixel; and a second switching element for forcefully turning the first switching element to a conducted state so that the optical-and-electrical converting means is connected to the one of the data lines which is connected to the same pixel when both of the one of the horizontal address lines which is connected to the same pixel and the one of the vertical address lines which is connected to the same pixel become active so as to assign the horizontal address and the vertical address allocated to the same pixel, and wherein the second switching element comprises a transistor having a drive electrode connected to either one of the one of the horizontal address lines which is connected to the same pixel or the one of the vertical address lines which is connected to the same pixel, a first electrode connected to the other of the one of the horizontal address lines which is connected to the same pixel or the one of the vertical address lines which is connected to the same pixel, a second electrode connected to a drive electrode of the first switching element.

* * * * *